United States Patent
Chiu et al.

(10) Patent No.: US 9,473,705 B2
(45) Date of Patent: Oct. 18, 2016

(54) CAMERA DEVICE AND METHOD FOR DETERMINING FIELD OF VIEW OF THE CAMERA DEVICE

(71) Applicant: HON HAI PRECISION INDUSTRY CO., LTD., New Taipei (TW)

(72) Inventors: Hsiao-Ping Chiu, New Taipei (TW); Hsueh-Tsen Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 606 days.

(21) Appl. No.: 13/914,588

(22) Filed: Jun. 10, 2013

(65) Prior Publication Data

US 2013/0335577 A1    Dec. 19, 2013

(30) Foreign Application Priority Data

Jun. 13, 2012 (TW) .............................. 101121181 A

(51) Int. Cl.
*H04N 5/232* (2006.01)
(52) U.S. Cl.
CPC ................................. *H04N 5/23296* (2013.01)
(58) Field of Classification Search
None
See application file for complete search history.

(56) References Cited

U.S. PATENT DOCUMENTS

| | | | |
|---|---|---|---|
| 2008/0218582 A1* | 9/2008 | Buckler | H04N 7/15 348/14.08 |
| 2013/0179288 A1* | 7/2013 | Moses | G06Q 10/00 705/26.1 |

FOREIGN PATENT DOCUMENTS

| | | |
|---|---|---|
| TW | 200930098 A | 7/2009 |
| TW | 201116051 A | 5/2011 |

* cited by examiner

*Primary Examiner* — Frederick Bailey
(74) *Attorney, Agent, or Firm* — Zhigang Ma

(57) ABSTRACT

In a method for determining a field of view of a camera device, a location device sends position information to establish anchor points. The camera device captures images of the anchor points, and obtains vertical angles of the anchor points, horizontal angles of the anchor points, and distances between the camera device and the anchor points. Each anchor point corresponds to one or more speakers. The method calculates rotation angles of speakers according to the vertical angles, the horizontal angles, the distances and anthropometric values of the speakers. The method further determines the field of view of the camera device according to the rotation angles.

6 Claims, 4 Drawing Sheets

CAMERA DEVICE AND METHOD FOR DETERMINING FIELD OF VIEW OF THE CAMERA DEVICE

BACKGROUND

1. Technical Field

Embodiments of the present disclosure generally relate to view measurement techniques, and more specifically to a camera device and method for determining a field of view of the camera device.

2. Description of Related Art

A camera device in a meeting room is adjusted by a remote control to point at a position of a speaker to capture images. However, because the camera device often rotates at a high speed (about 300 degrees per second), when the camera device needs to capture images of a speaker, the camera device may miss the position of the speaker because of the high speed. Therefore, there is room for improvement in locating the position of the speaker.

DETAILED DESCRIPTION

The application is illustrated by way of examples and not by way of limitation in the figures of the accompanying drawings in which like references indicate similar elements. It should be noted that references to "an" or "one" embodiment in this disclosure are not necessarily to the same embodiment, and such references mean "at least one."

In general, the word "module" as used hereinafter, refers to logic embodied in hardware or firmware, or to a collection of software instructions, written in a programming language, such as, for example, Java, C, or assembly. One or more software instructions in the modules may be embedded in firmware. It will be appreciated that modules may comprised connected logic units, such as gates and flip-flops, and may comprise programmable units, such as programmable gate arrays or processors. The modules described herein may be implemented as either software and/or hardware modules and may be stored in any type of non-transitory computer-readable storage medium or other storage system. The non-transitory computer-readable storage medium may include CDs, DVDs, BLU-RAY, flash memory, and hard disk drives.

Figure 1:
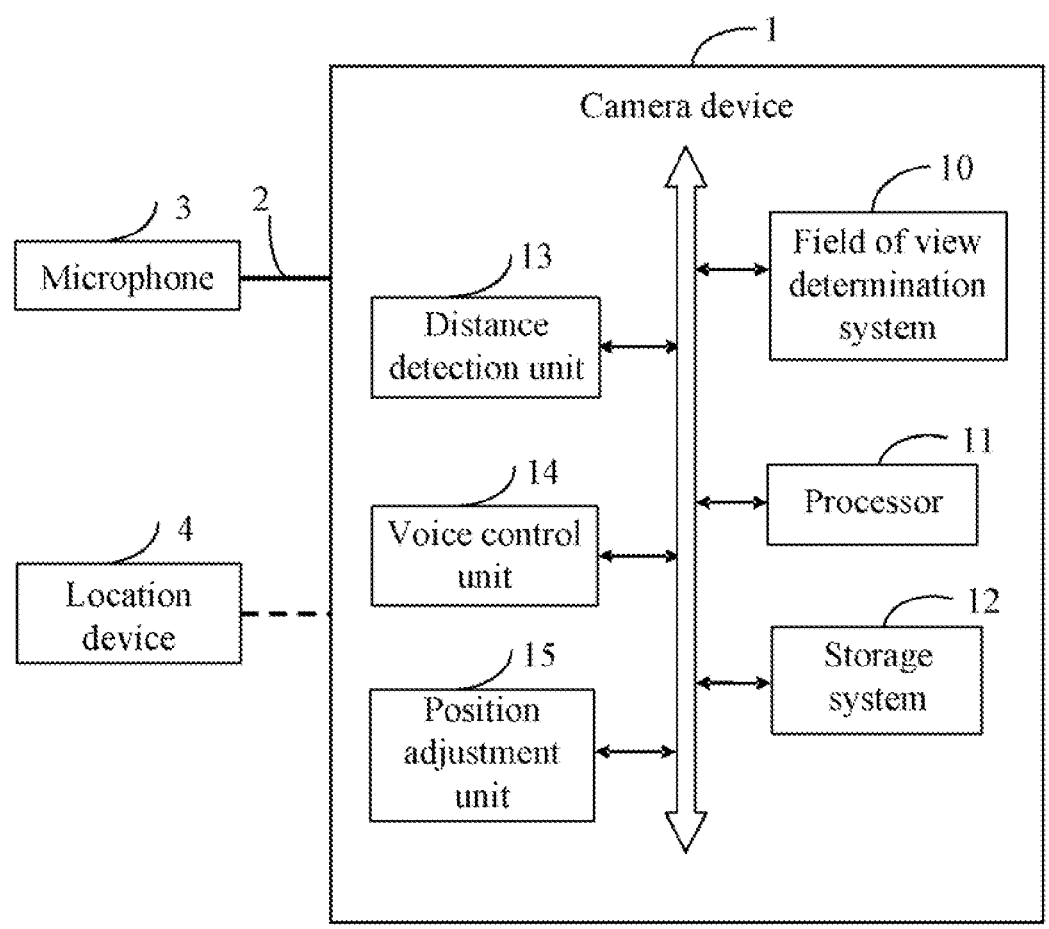
FIG. 1 is a block diagram of one embodiment of a camera device including a field of view determination system.

FIG. 1 is a block diagram of one embodiment of a camera device 1 including a field of view determination system 10. The camera device 1 may be a video camera that can be adjusted up or down and be rotated left or right, for example. In one embodiment, the camera device 1 is connected to one or more microphones 3 through one or more cables 2. As shown in FIG. 1, the camera device 1 is only connected to one microphone 3 through one cable 2. The microphone 3 collects audio signals of speakers in a meeting room, where the audio signal may be speech or other sounds. When the microphone 3 is used by a speaker, the camera device 1 is adjusted to capture images of the speaker according to a position of the speaker. The camera device 1 also captures images of anchor points located by a location device 4 that is wirelessly connected to the camera device 1. The location device 4 is controlled by a user to send position information to establish the anchor points. The anchor points are defined to be points corresponding to the position information. The location device 4 may be a remote control, a laser transmitter, or an infrared emitter, for example. After the camera device 1 captures images of each of the speakers and/or each of the anchor points, the camera device 1 returns to an initial aiming position. The initial aiming position is a default position of the camera device 1 when the camera device 1 is stationary.

The camera device 1 further includes a distance detection unit 13, a voice control unit 14, and a position adjustment unit 15. The distance detection unit 13 is used to obtain a distance between the camera device 1 and each of the anchor points. The voice control unit 14 receives audio signals from the microphone 3. The position adjustment unit 15 may include one or more camera lenses and an adjustment unit disposed on the one or more camera lenses. The position adjustment unit 15 orients the camera device 1 to point at the position of each of the anchor points or the position of each of the speakers. When the camera device 1 is oriented to point at the position of each of the anchor points, the position adjustment unit 15 obtains a vertical angle of each of the anchor points and a horizontal angle of each of the anchor points. The vertical angle is an angle to which the camera device 1 moves vertically, either upwards or downwards, with respect to the initial position. The horizontal angle is an angle to which the camera device 1 moves horizontally, to the left or the right, with respect to the initial position.

The camera device 1 further includes a processor 11 and a storage system 12. The processor 11 executes one or more computerized codes and other applications for the camera device 1, to provide functions of the field of view determination system 10. The storage system 12 stores data of the camera device 1. In one embodiment, the storage system 12 may be an internal storage device, such as a random access memory (RAM) for temporary storage of information, and/or a read only memory (ROM) for permanent storage of information.

Figure 2:
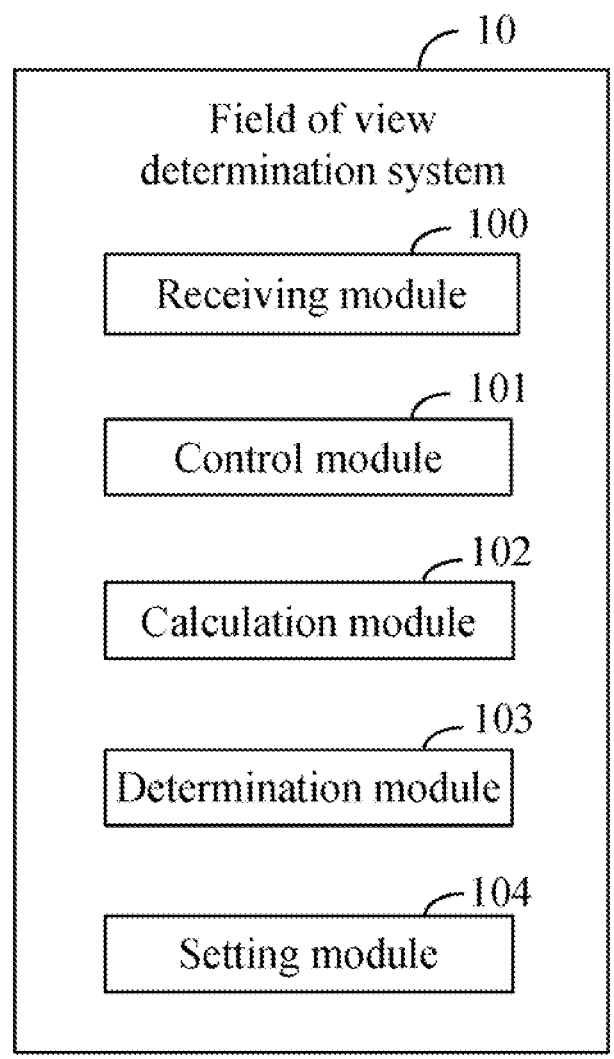
FIG. 2 is a block diagram of function modules of the field of view determination system of the camera device of FIG. 1.

The field of view determination system 10 includes a plurality of function modules to determine a filed of view of the camera device 1 according to the positions of the anchor points, and to control the camera device 1 to capture images of the speakers. The field of view determines maximum angles that the camera device 1 can turn left and right. As shown in FIG. 2, the field of view determination system 10 includes a receiving module 100, a control module 101, a calculation module 102, a determination module 103, and a setting module 104. The modules 100-104 comprise computerized codes in the form of one or more programs that are stored in the storage system 12 and executed by the processor 11 to provide functions for the modules, the functions are illustrated in FIG. 3.

Figure 3:
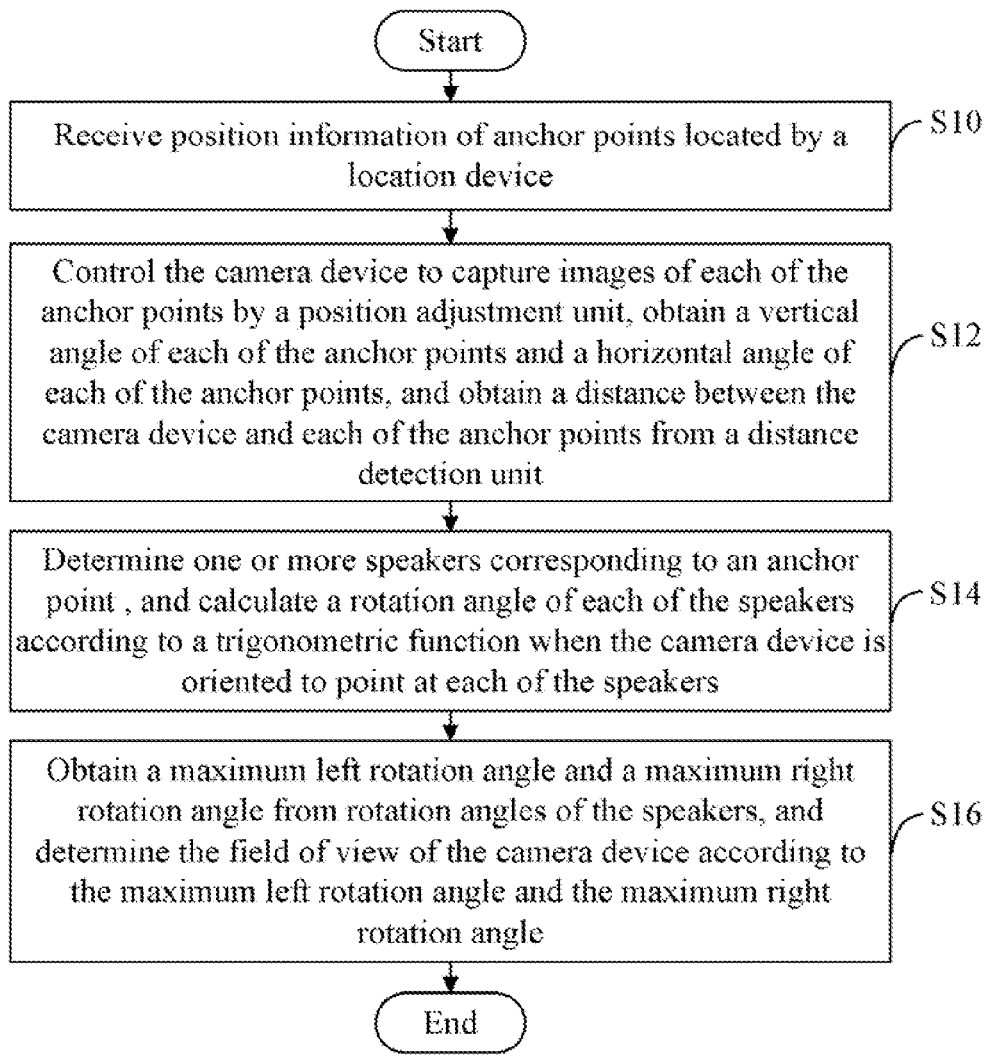
FIG. 3 is a flowchart of one embodiment of a method for determining a field of view of the camera device of FIG. 1.

FIG. 3 is a flowchart of one embodiment of a method for determining a field of view of the camera device 1. The method can be performed by execution of a computer-readable program code by the at least one processor 11 of the camera device 1 shown in FIG. 1. Depending on the embodiment, additional blocks in the flowchart of FIG. 3 may be added, others removed, and the ordering of the steps may be changed.

Figure 4:
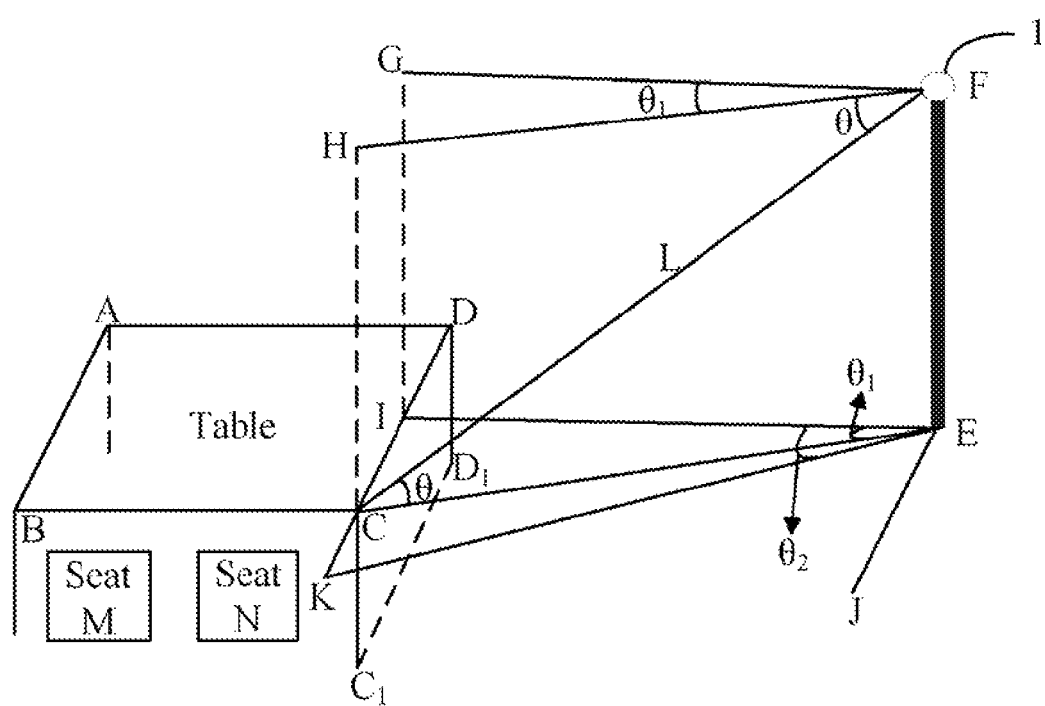
FIG. 4 is a schematic diagram illustrating the camera device in a meeting room.

In step S10, the receiving module 100 receives information of anchor points located by the location device 4. The information of anchor points includes coordinate values of the anchor points in a rectangular space coordinate system. As shown in FIG. 4, the camera device 1 is placed to face and overlook side CD of a table ABCD, where the table ABCD is rectangular. After four corners of the table ABCD are located as the four anchor points by the location device 4, the receiving module 100 receives four coordinate values of the four anchor points (anchor point A, anchor point B, anchor point C, and anchor point D). The four anchor points are the four corners of the table ABCD. In one embodiment, the initial aiming position of the camera device 1 is along the line FG in FIG. 4, where the line FG is parallel to the plane of the top of the table ABCD, and is at a right angle to a plane $CDD_1C_1$ that is vertical to the plane of the top of the table ABCD.

As shown in FIG. 4, the location of the camera device 1 is at point F. Point E represents zero vertical height of the camera device 1 above the plane of the top of the table ABCD. In one embodiment, the point E is the origin of the rectangular space coordinate system. A line EF represents a z-axis of the rectangular space coordinate system. The plane of the top of the table ABCD has a point I, from which point a line EI is vertical to the edge CD of the table ABCD. The line EI represents an x-axis of the rectangular space coordinate system. A line from point E (for example, a line EJ on the plane of the top of the table ABCD represents a y-axis of the rectangular space coordinate system, where the line from point E is vertical to the line EI.

In step S12, the control module 101 controls the camera device 1 to capture images of each of the anchor points by the position adjustment unit 15, and obtains the vertical angle of each of the anchor points and the horizontal angle of each of the anchor points. The control module 101 further obtains a distance between the camera device 1 and each of the anchor points from the distance detection unit 13.

As shown in FIG. 4, when the camera device 1 captures images of the anchor point C, the position adjustment unit 15 orients the camera device 1 to move from the initial aiming line FG to the anchor point C. In other words, the camera device 1 moves from the aiming along line FG to an aiming along line FH (a horizontal angle ∠GFH corresponds to an angle $\theta_1$) in a horizontal direction, and then moves down to an aiming along line FC (a vertical angle ∠HFC corresponds to an angle θ) in a vertical direction. The distance between the camera device 1 and the anchor point C is a length of the line FC (for example, a distance L).

In step S14, the calculation module 102 determines one or more speakers corresponding to an anchor point, and calculates a rotation angle of each of the speakers according to a trigonometric function when the camera device 1 is oriented to point at each of the speakers. The rotation angle is an angle that the camera device 1 moves horizontally to left or right with respect to the initial position.

In one embodiment, the trigonometric function is obtained according to a vertical angle of an anchor point corresponding to the located speaker, a horizontal angle of the anchor point corresponding to the located speaker, a distance between the camera device 1 and the anchor point corresponding to the located speaker, and an anthropometric value of the located speaker. The anthropometric value is a vertical distance between the located speaker and a desktop as delineated by the anchor points. As shown in FIG. 4, the desktop is the table ABCD.

In one embodiment, the setting module 104 sets an anthropometric value of each of the speakers. As shown in FIG. 4, a seat M and a seat N are placed along side BC of the table ABCD. A speaker M1 is seated on the seat M, and a speaker N1 is seated on the seat N. The calculation module 102 determines that the speaker M1 corresponds to an anchor point B, and the speaker N1 corresponds to an anchor point C. In one embodiment, the setting module 104 sets a vertical distance between a seat of a speaker and the desktop as an anthropometric value of the speaker. For example, the vertical distance between the seat M and the table ABCD, and the vertical distance between the seat N and the table ABCD are both 60 centimeters (cm), the setting module 104 sets an anthropometric value of the speaker M1 and an anthropometric value of the speaker N1 to 60 cm.

If an anchor point does not correspond to a speaker, the calculation module 102 determines a virtual speaker for the anchor point, and the setting module 104 sets an anthropometric value of the virtual speaker to zero. As shown in FIG. 4, a side AD of the table ABCD does not have a speaker. In other words, the anchor point A and the anchor point D do not correspond to speakers, thus the setting module 104 sets the anthropometric values of both the anchor point A and the anchor point D to zero.

In one embodiment, the trigonometric function is described according to an example for calculating a rotation angle of the speaker N1. As shown in FIG. 4, a rotation angle of the speaker N1 is angle $\theta_2$, and the trigonometric function corresponding to the speaker N1 is tan $\theta_2$=(the distance L×cos θ×sin $\theta_1$+the anthropometric value of the speaker N1)/(the distance L×cos θ×cos $\theta_1$). The distance L is the distance between the camera device 1 and the anchor point C. The angle $\theta_1$ is a horizontal angle of the anchor point C, and the angle θ is a vertical angle of the anchor point C.

In step S16, the determination module 103 obtains a maximum left rotation angle and a maximum right rotation angle from rotation angles of the speakers, and determines the field of view of the camera device 1 according to the maximum left rotation angle and the maximum right rotation angle. A left rotation angle is an angle through which the camera device 1 moves horizontally to the left with respect to the initial position. A right rotation angle is an angle through which the camera device 1 moves horizontally to the right with respect to the initial position. In one embodiment, the maximum left rotation angle and the maximum right rotation angle constitute the field of view of the camera device 1.

After the field of view of the camera device 1 is determined, when the microphone 3 receives audio signals from a speaker, the receiving module 100 receives the audio signals of the speaker from the voice control unit 14 to determine a position of the speaker. The control module 101 controls the camera device 1 to point at the position of the speaker to capture images of the speaker, by the position adjustment unit 15.

In this disclosure, the camera device 1 captures images of speakers that use microphones 3. After the field of view of the camera device 1 is determined, the camera device 1 is oriented to point at a position of a speaker who is speaking. This disclosure can avoid the camera device 1 missing the position of a speaker, and enhance accuracy and speed of locating the position of any next speaker.

The described embodiments are merely possible examples of implementations, and have been set forth for a clear understanding of the principles of the present disclosure. Many variations and modifications may be made without departing substantially from the spirit and principles of the present disclosure. All such modifications and variations are intended to be included within the scope of this disclosure and the described inventive embodiments, and the present disclosure is protected by the following claims.

What is claimed is:

1. A method for determining a field of view of a camera device, the method comprising:
obtaining position information of anchor points using at least one processor of the camera device;
controlling the camera device to capture images of each of the anchor points, and obtaining a vertical angle of each of the anchor points and a horizontal angle of each of the anchor points;
obtaining a distance between the camera device and each of the anchor points using the at least one processor;
determining one or more speakers corresponding to each of the anchor points, and determining a virtual speaker for an anchor point when the anchor point does not correspond to a speaker;
calculating a rotation angle of each of the speakers according to a trigonometric function when the camera device is oriented to point at each of the speakers, wherein the trigonometric function is obtained according to a vertical angle of an anchor point corresponding to the located speaker, a horizontal angle of the anchor point corresponding to the located speaker, a distance between the camera device and the anchor point corresponding to the located speaker, and an anthropometric value of the located speaker, wherein the anthropometric value is a vertical distance between the located speaker and a desktop as delineated by the anchor points; and
obtaining a maximum left rotation angle and a maximum right rotation angle from rotation angles of the speakers, and determining the field of view of the camera device according to the maximum left rotation angle and the maximum right rotation angle.

2. The method as claimed in claim 1, wherein a rotation angle of the located speaker is angle $\theta_2$, and the trigonometric function is $\tan \theta_2 =$ (a distance $L \times \cos \theta \times \sin \theta_1$ + an anthropometric value of the located speaker)/(the distance $L \times \cos \theta \times \cos \theta_1$), wherein the distance L is the distance between the camera device and an anchor point corresponding to the located speaker, the angle $\theta_1$ is a horizontal angle of the anchor point corresponding to the located speaker, and the angle $\theta$ is a vertical angle of the anchor point corresponding to the located speaker.

3. A non-transitory computer readable storage medium storing a set of instructions, when executed by at least one processor of a camera device, cause the at least one processor to perform a method for determining a field of view of the camera device, the method comprising:
obtaining position information of anchor points using the at least one processor of the camera device;
controlling the camera device to capture images of each of the anchor points, and obtaining a vertical angle of each of the anchor points and a horizontal angle of each of the anchor points;
obtaining a distance between the camera device and each of the anchor points using the at least one processor;
determining one or more speakers corresponding to each of the anchor points, and determining a virtual speaker for an anchor point when the anchor point does not correspond to a speaker;
calculating a rotation angle of each of the speakers according to a trigonometric function when the camera device is oriented to point at each of the speakers, wherein the trigonometric function is obtained according to a vertical angle of an anchor point corresponding to the located speaker, a horizontal angle of the anchor point corresponding to the located speaker, a distance between the camera device and the anchor point corresponding to the located speaker, and an anthropometric value of the located speaker, wherein the anthropometric value is a vertical distance between the located speaker and a desktop as delineated by the anchor points; and
obtaining a maximum left rotation angle and a maximum right rotation angle from rotation angles of the speakers, and determining the field of view of the camera device according to the maximum left rotation angle and the maximum right rotation angle.

4. The storage medium as claimed in claim 3, wherein a rotation angle of the located speaker is angle $\theta_2$, and the trigonometric function is $\tan \theta_2 =$ (a distance $L \times \cos \theta \times \sin \theta_1$ + an anthropometric value of the located speaker)/(the distance $L \times \cos \theta \times \cos \theta_1$), wherein the distance L is the distance between the camera device and an anchor point corresponding to the located speaker, the angle $\theta_1$ is a horizontal angle of the anchor point corresponding to the located speaker, and the angle $\theta$ is a vertical angle of the anchor point corresponding to the located speaker.

5. A camera device, comprising:
a distance detection unit;
at least one processor;
a computer-readable storage medium storing one or more programs stored in the storage system, which when executed by the at least one processor, cause the at least one processor to:
obtain position information of anchor points;
control the camera device to capture images of each of the anchor points, and obtain a vertical angle of each of the anchor points and a horizontal angle of each of the anchor points;
obtain a distance between the camera device and each of the anchor points;
determine one or more speakers corresponding to each of the anchor points, and determining a virtual speaker for an anchor point when the anchor point does not correspond to a speaker;
calculate a rotation angle of each of the speakers according to a trigonometric function when the camera device is oriented to point at each of the speakers, wherein the trigonometric function is obtained according to a vertical angle of an anchor point corresponding to the located speaker, a horizontal angle of the anchor point corresponding to the located speaker, a distance between the camera device and the anchor point corresponding to the located speaker, and an anthropometric value of the located speaker, wherein the anthropometric value is a vertical distance between the located speaker and a desktop as delineated by the anchor points; and
obtain a maximum left rotation angle and a maximum right rotation angle from rotation angles of the speakers, and determine the field of view of the camera device according to the maximum left rotation angle and the maximum right rotation angle.

6. The camera device as claimed in claim 5, wherein a rotation angle of the located speaker is angle $\theta_2$, and the trigonometric function is $\tan \theta_2 =$ (a distance $L \times \cos \theta \times \sin \theta_1$ + an anthropometric value of the located speaker)/(the distance $L \times \cos \theta \times \cos \theta_1$), wherein the distance L is the distance between the camera device and an anchor point corresponding to the located speaker, the angle $\theta_1$ is a horizontal angle of the anchor point corresponding to the located speaker, and the angle θ is a vertical angle of the anchor point corresponding to the located speaker.

\* \* \* \* \*